United States Patent [19]

McCarthy

[11] 4,138,089
[45] Feb. 6, 1979

[54] SLIDE VALVE

[75] Inventor: Charles J. McCarthy, Rockville, Md.

[73] Assignee: The United States of America as represented by the Secretary of the Department of Health, Education and Welfare, Washington, D.C.

[21] Appl. No.: 823,142

[22] Filed: Aug. 9, 1977

[51] Int. Cl.² .................................... F16K 31/128
[52] U.S. Cl. ............................ 251/61; 137/625.48; 251/31; 251/176; 251/326
[58] Field of Search ................. 137/624.58; 251/61, 251/61.4, 62, 63.4, 63.6, 176, 205, 326, 328

[56] References Cited

U.S. PATENT DOCUMENTS

| 537,593 | 4/1895 | Womersley et al. | 251/30 |
| 1,969,092 | 8/1934 | Mussen | 251/176 |
| 3,056,574 | 10/1962 | Greenwalt | 251/176 |
| 3,448,959 | 6/1969 | McHale et al. | 251/61 |
| 3,674,236 | 7/1972 | Commarmot | 251/176 |
| 3,773,082 | 11/1973 | Davis | 251/61 |

OTHER PUBLICATIONS

Bio-Logics, Inc. — The Fluidivalve.
Chromatronix, Inc. — Cheminert Fittings.

Primary Examiner—Martin P. Schwadron
Assistant Examiner—G. L. Walton
Attorney, Agent, or Firm—Browdy and Neimark

[57] ABSTRACT

A diaphragm-actuated slide valve where spring force is utilized to urge the moving slide valve element against the stationary valve element. To obtain a good seal at the valving ports with a minimum of spring force, the moving slide valve element is made to present a convex contact face to the stationary valve element at the port region of the moving valve element. At the same time, a clamping connection of the fluid tube to the moving slide valve element is obtained. The moving slide valve element is in the form of an apertured, initially flat block. The fluid tube passes through an aperture in an initially curved spring clamp plate provided with clamping serrations in the tube-receiving aperture, the tube engaging in a counterbore in the valve block at its port. Clamping screws engage through opposite parts of the clamp plate and threadedly engage the valve block at opposite spaced locations relative to the tube. Tightening the screws clamps the tube in the counterbore and causes the valve block to generate a convex contact face, while straightening the spring plate, because the tube acts as a center abutment for the valve block, loading the valve block in the manner of a simple beam.

15 Claims, 7 Drawing Figures

SLIDE VALVE

FIELD OF THE INVENTION

This invention relates to fluid control valves, and more particularly to slide valves of the type wherein a movable slide valve element is held sealingly against a cooperating stationary valve element by spring force.

BACKGROUND OF THE INVENTION

In the usual type of known slide valve for controlling fluid flow, a movable slide block has a port which can be moved into alignment with a port in a stationary valve block. In order to keep the valved fluid from leaking, the blocks must be urged together with sufficient force to retain the fluid at the interface between the relatively movable blocks. However, if the retention force is high, a relatively large force is required to shift the movable valve block. There is an important need to minimize the required amount of shifting force, particularly in the case of valves of the diaphragm type, wherein it is desirable to employ low pressure diaphragm assemblies and also to keep the diaphragm diameter and valve size small. In the slide valves heretofore employed, the cooperating valve sealing surfaces are flat and have large frictional resistance because of the extensive contacting surface areas. Therefore, a relatively large shifting force is required. In the case of diaphragm valve assemblies, relatively large-area diaphragms and relatively high shifting fluid pressures are required.

Examples of typical designs previously employed in the prior art are illustrated in the following prior U.S. patents, found in a preliminary search, which appear to show the present state of the art:

Hartman, — U.S. Pat. No. 3,610,574
Armstrong, — U.S. Pat. No. 3,661,357
Davis, — U.S. Pat. No. 3,773,082
Commarmot, — U.S. Pat. No. 3,674,236
Dietzsch, 13 U.S. Pat. No. 3,933,339
Bauman, — U.S. Pat. No. 3,955,591

SUMMARY OF THE INVENTION

It has been found that the required valve shifting force can be reduced if the frictional loading force of the relatively movable valve block elements is reduced, and said loading force required can be reduced without risking leakage if the unit surface pressure at the valve orifice can be maintained by other means. In accordance with the present invention this is accomplished by making one of the valve faces a curved surface in the region of the associated orifice. This greatly reduces the contacting frictional surface areas between the valve block elements without loss of the necessary unit sealing pressure to prevent leakage.

Accordingly, a main object of the present invention is to provide for improved valving function; another object is to provide an improved fluid slide valve which avoids the above-mentioned deficiencies of the previously-employed slide valves.

A further object of the invention is to provide an improved fluid slide valve which requires only a relatively small magnitude of valve shifting force.

A still further object of the invention is to provide an improved fluid slide valve of the spring-sealed type which can employ a relatively soft spring and still produce a relatively large unit pressure over the contacting areas of the ported cooperating valve elements, whereby to prevent leakage of the valved fluid.

Another object is to provide an inert slide valve that can be shifted with the signal output of a fluidic control circuit and can be easily connected to small inert tubing.

A still further object of the invention is to provide an improved fluid slide valve wherein one ported valve element presents a convex contact face to the cooperating ported valve element, whereby to provide adequate anti-leakage contacting pressure between the cooperating valve elements without requiring a large force urging the valve elements together.

A still further object of the invention is to provide an improved fluid slide valve wherein the moving slide valve element is made to present a convex contact face to the stationary valve element and at the same time a clamping connection of the associated fluid tube to the moving slide valve element is obtained.

A still further object of the invention is to provide an improved fluid slide valve of the diaphragm-operated type wherein only relatively light spring force is required to hold the moving slide valve element sealingly against the stationary valve element and wherein one valve element presents a convex contacting surface against the other valve element, whereby to define only a small frictional surface area of one element against the other, thus allowing the valve to be operated with relatively small diaphragms and with relatively small diaphragm-actuating fluid pressure.

BRIEF DESCRIPTION OF THE DRAWINGS

Further objects and advantages of the invention will become apparent from the following description and claims, and from the accompanying drawings, wherein:

DESCRIPTION OF PREFERRED EMBODIMENTS

Figure 1:
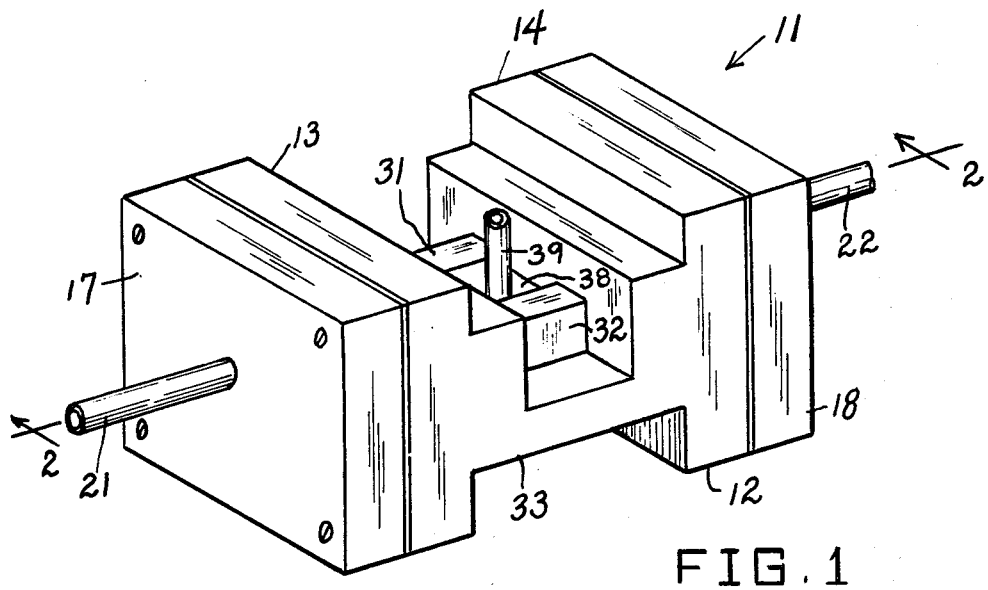
FIG. 1 is a perspective view of a typical diaphragm-operated slide valve assembly employing cooperating slide valve elements constructed in accordance with the present invention.

Referring to the drawings, 11 generally designates a typical diaphragm-actuated fluid slide valve, for exaple, a slide valve of the type disclosed in U.S. Pat. No. 3,775,082 to William P. Davis. The fluid slide valve 11 includes a one-piece main body 12 having enlarged cup-shaped end portions 13 and 14. Respective flexible diaphragms 15 and 16 are peripherally secured to the end portions 13 and 14 by cup-shaped end caps 17 and 18, defining fluid-tight chambers 19 and 20. Fluid pressure control conduits 21 and 22 are communicatively connected to the chambers 19 and 20.

Figure 2:
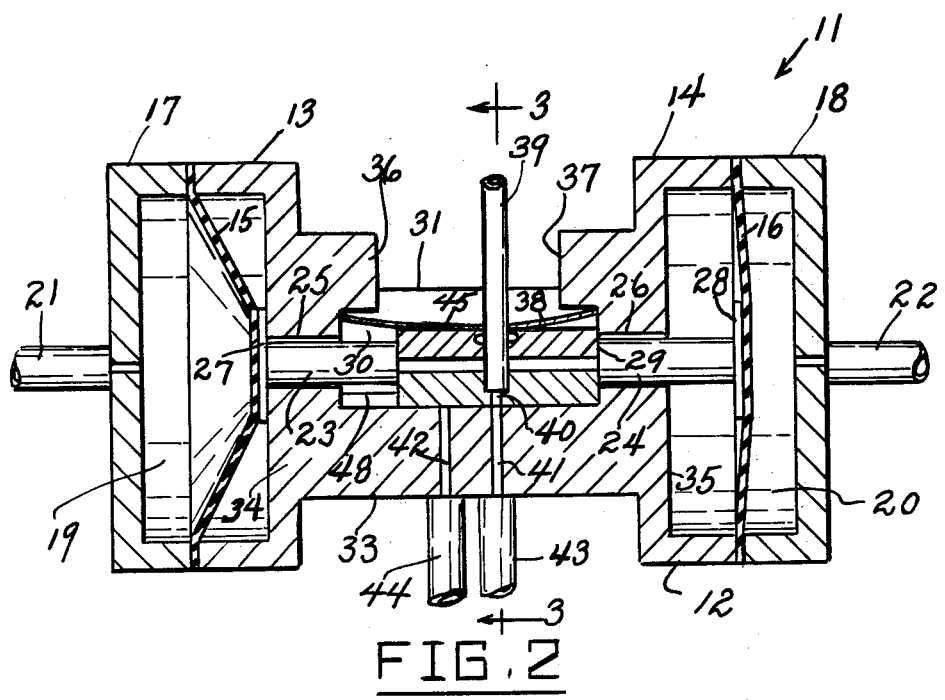
FIG. 2 is a longitudinal vertical cross-sectional view taken substantially on line 2—2 of FIG. 1.

Respective plunger members 23 and 24 are loosely and slidably mounted in aligned longitudinal bores 25 and 26 formed axially in body 12 and are engageable at their outer ends by rigid disc members 27 and 28 secured to the central portions of the diaphragms 15 and 16, as shown in FIG. 2. The inner ends of the plunger members 23 and 24 engage the opposite ends of a movable slide valve assembly generally designated at 29.

Slide valve assembly 29 is slidably mounted in a longitudinal recess 30 formed in body 12 between the cup portions 13 and 14 and defined between a pair of spaced upstanding longitudinal ribs 31, 32, by bottom wall 33, transverse end walls 34, 35 containing the plunger bores 25, 26, and spaced opposing inwardly projecting overhanging transverse flanges 36, 37 respectively formed on the upper portions of said end walls 34, 35. A downwardly convex leaf spring 38 is provided in the recess 30 with its ends respectively engaged under the flanges 36, 37 and with its bowed central portion slidably bearing on the movable valve assembly 29 and urging it into sealing contact with bottom wall 33.

A flexible fluid inlet conduit 39 is connected to the sliding valve assembly 29 in a manner presently to be described, in communication with the face port 40 of valve assembly 29. The valve assembly 29 may be moved by the control fluid supplied to conduits 21 and 22 so as to be selectively registrable with fluid outlet ports 41 or 42 in bottom wall 33, respectively communicatively connected to fluid outlet conduits 43 and 44. Leaf spring 38 is provided with a longitudinal slot 45 through which the flexible inlet conduit 39 passes and which allows longitudinal movement of the slide valve assembly 29. The end walls 34 and 35 act as stops to limit longitudinal movement of assembly 29 to positions wherein port 40 is in registry with either outlet port 41 or outlet port 42.

The valve 11 above described therefore operates as a switching valve to selectively connect conduit 39 to either conduit 43 or conduit 44. Obviously, the described structure may be employed to perform other valve functions. For example, by omitting port 42 and conduit 44, the device may be employed merely to control fluid flow between conduit 39 and conduit 43.

Figure 3:
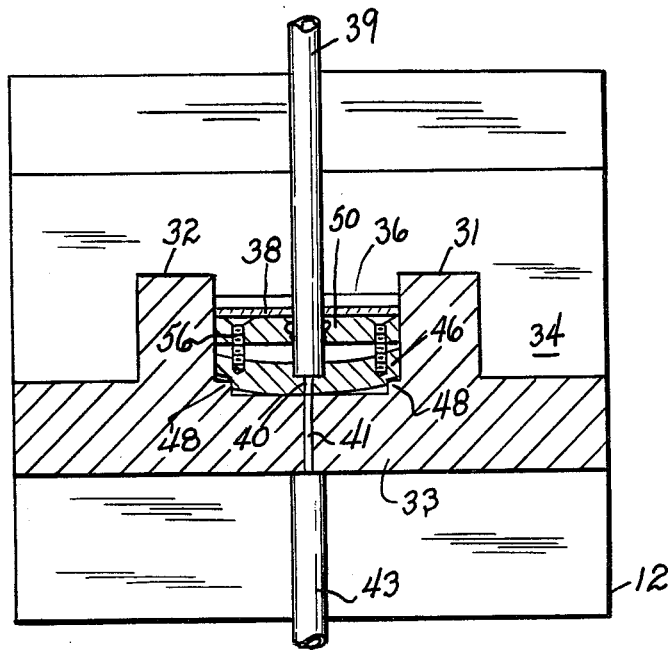
FIG. 3 is an enlarged transverse vertical cross-sectional view taken substantially on line 3—3 of FIG. 2.
Figure 4:
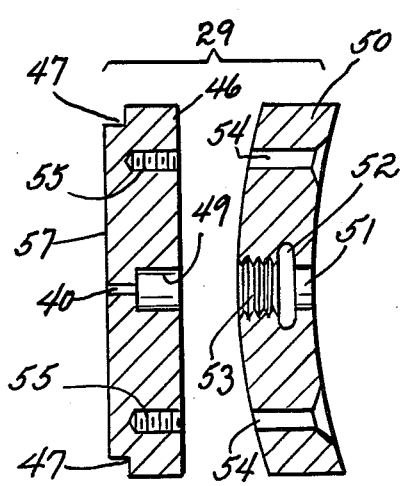
FIG. 4 is an enlarged vertical cross-sectional view taken centrally through the face plate and spring clamp plate of the movable slide valve assembly of FIGS. 1 to 3, prior to the clamping of the associated fluid tube thereto and the mutual tensioning of the plates to define a convex face plate-contacting surface.
Figure 5:
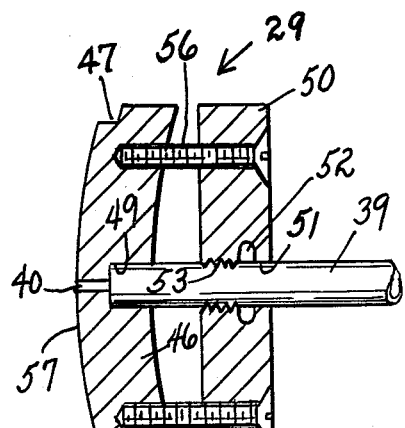
FIG. 5 is a cross-sectional view similar to FIG. 4, but showing the fluid tube clamped to the movable slide valve assembly and the face plate bowed so that its contacting surface is convex.

Referring to FIGS. 4 and 5, the slide valve assembly 29 comprises a face block 46 of suitable somewhat flexible inert material, such as resilient corrosion-resistant metal or suitable resilient inert plastic material, such as Teflon, Kel-f, or the like. Block 46 is shaped to conformably slidably fit into the recess 30 and has rabetted longitudinal edge grooves 47, 47 adapted to slidably interfit with longitudinal step elements 48, 48 formed at the longitudinal corners defined between ribs 31, 32 and bottom wall 33, as shown in FIG. 3. Face block 46 is formed centrally with the port 40, which communicates with a counterbore 49 shaped to receive the end of the fluid inlet tube 39. Face block 46 has a normally flat configuration, but can be bowed to an arcuately curved convex configuration, as will be presently explained.

Designated at 50 is a spring block, of suitable spring metal, or the like, having a shape and size substantially similar to that of face block 46 so that it will also slidably fit in the recess 30. Block 50 has a normally arcuately curved configuration, as shown in FIG. 4, convexly facing face block 46. Block 50 has a central aperture 51 shaped to slidably receive the inlet tube 39, with an annular enlargement 52 adjacent thereto, and a leftwardly flaring serrated bore 53, as viewed in FIG. 4. The tube 39 is normally insertable through the aperture 51 and the leftwardly flaring serrated bore portion 53, with a fairly close fit. On opposite sides of the central aperture 51 the spring block 50 is provided with suitably countersunk bolt holes 54, 54, which are registrable with tapped holes 55, 55 provided in block 46.

In connecting the slide valve assembly 29 to the fluid inlet tube 39, said tube is inserted through aperture 51 and serrated bore 53 and is seated in the counterbore 49. Clamping screws 56, 56 are inserted through the holes 54, 54 and are threadedly engaged in the tapped holes 55, 55. As the screws 56, 56 begin to exert clamping force, the end of tube 39 begins to act as an abutment support and the serrations of bore 53 begin to grip the tube 39. As tightening of the screws continues, bore 53 grips the tube 39 with increasing tightness. With the end of the tube 39 acting as an abutment support in counterbore 49, spring block 50 is flexed to a substantially flat configuration and face block 46 is flexed to an arcuately curved configuration, as shown in FIG. 5, with the contact face 57 thereof convex. When the slide valve assembly 29 is engaged in the recess 30 it therefore presents a convex face to the flat valving surface adjacent to the ports 41, 42 of the bottom wall 33. The leaf spring 38 may be engaged on the tube 39 prior to its securement to blocks 46, 50. After the placement of the assembly 29 in the recess 30, the leaf spring 38 may be reversely flexed to allow its ends to engage beneath the flanges 36, 37 and then released, whereby the downwardly bowed leaf spring 38 exerts downward force on the assembly 29 and urges it sealingly against bottom wall 33, with the arcuately curved face 57 pressed against the cooperating flat stationary valving face of bottom wall 33 in the region adjacent the port 40. As above explained, this concentrates the sealing force in the desired sealing area, allows a relatively yieldable leaf spring 38 to be employed, and minimizes the frictional loading on the diaphragms 15, 16.

Figure 6:
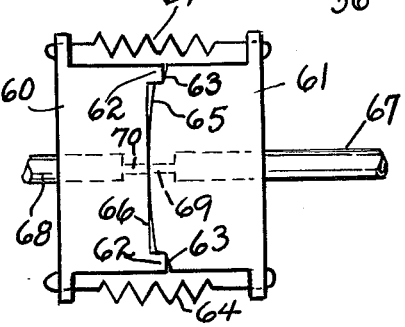
FIG. 6 is a diagrammatic end elevational view of a pair of spring-held cooperating slide valve elements according to the present invention, showing the profiles of the mutually-cooperating contact surfaces of the slide valve elements, wherein one surface is flat and the other is convex.

FIG. 6 shows the broad schematic arrangement of the cooperating relatively movable valving block elements of a slide valve according to the principles of the present invention. Thus, the generalized slide valve assembly may comprise a pair of valve block members 60, 61 with one member being movable relative to the other in a direction permitted by guide ribs 62, 62 on member 60 received in rabetted grooves 63, 63 in member 61. The members 60, 61 are urged into sealing contact with each other by springs 64, 64 connecting them on opposite sides. Member 61 has a curved face 65 slidably engaging a flat valving face 66 on member 60. Fluid flow may therefore be controlled through the conduits 67, 68 respectively connected to the valving elements 61, 60, the valving ports, shown at 69, 70 being located in the contact zone of the valve faces 65, 66.

As will be apparent from FIG. 6, either one of the members 60, 61 may be the movable valve element, the other member being stationary. Also, if so desired, both valving faces may be convexly curved in opposition to each other, within the spirit of the present invention. With any of these possible arrangements the net result is the same, namely, to reduce the required anti-leak spring force urging the valve elements into sealing contact with each other, and to reduce the frictional loading on the associated valve-actuating means.

With respect to the tube-clamping arrangement shown in FIGS. 4 and 5, in slide valves made of inert materials, such as Teflon, Kel-f, and the like, there is a problem in connecting Teflon tubes to the slide blocks and keeping the size small. The connecting structure herein described overcomes this problem. It requires less preparation of the Teflon tube than any of the prior art methods of connection; it requires no flaring tool, no swaging tool, and no heating device. It is only necessary to assure that the end of the tube is cut square. Since the tube diameter does not have to be fitted with ferrules or compression nuts, it is possible to locate tube holes in the slide block fairly close together (for multiple tube connections). Along with the goals of keeping the valve small, making it leak-proof at reasonable pressures, and solving the tube attachment problem, the structure of the present invention also achieves high surface unit pressures around the valving ports while minimizing the required valve shifting force.

The above-described valve structure is also advantageous in that the slide valve elements have faces that fit together in a manner which allows movement in only the proper direction; also, the above-described valve structure achieves the requirement of having no stagnation or carryover volume.

It will be understood that a key principle of the present invention is the provision of a slide valve in which one of the valve faces constitutes a curved surface, exaggerated in the figures, by which the shfting force, used to open and close the valve is quite small. This permits the valve to be shifted with a low pressure diaphragm and also permits use of a small valve and small diameter diaphragm; the valve can accordingly be shifted with the signal output of a fluidic control circuit and can be easily connected to small inert tubing. While the valve of the instant invention has general utility, it is particularly useful for fluids in biological experiments, such as in the control of micro-quantity flows of enzymes, buffers, body fluid samples, etc. The valve achieves clean switching with no dead volume or complicated passageways, and may be used in any situation where low power valve switching is desired, e.g. where using the 1 psi output of a fluidic module as the power source for the valve actuator.

It will be further understood that the generalized arrangement shown in FIG. 6 also covers valves of the switching type, wherein one of the blocks has a plurality of spaced longitudinally-aligned ports along the line of sliding contact which are to be selectively registered with other similarly spaced longitudinally aligned ports in the other block along the line of contact. For example, the movable block may have three evenly spaced ports, two of which can be selectively registered with two similarly spaced ports provided in the stationary block, with the remaining port of the movable block held sealed by its contact with the stationary block.

Figure 7:
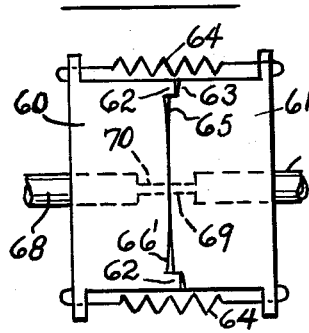
FIG. 7 is a diagrammatic view similar to FIG. 6, but showing a modification wherein both of the contacting surfaces are convex.

Both of the convex contacting surfaces may be cylindrically curved, as shown at 65, 66′ in FIG. 7.

The convex sealing surface, for example, the surface 65 in FIG. 6, is part of a cylindrical surface with its axis parallel to the direction of sliding movement. This assures that the theoretical contact of the valve blocks is a line contact rather than a point contact. The curvature of the convex contact faces shown in FIGS. 3 and 6 is considerably exaggerated for visibility, and actually is much less than shown. Both the stationary valve block and the movable valve block may have such cylindrical contact faces, with line contact. As the valve blocks are loaded together there is a deformation of the material along the line of contact, which causes the "line contact" to become a narrow "area contact". The narrow width of this area contact is sufficiently wide to include the entire valving orifices or valve ports. The direction of relative motion of the valve blocks is parallel to the original line of contact, and a valve port in one block is always closed by the surface of the other block unless it is in registry with a valve port in the other block.

As above mentioned, in an arrangement such as that shown in FIG. 6 the convex surface 65 is exaggerated for purposes of illustration. In actual practice, the ribs 62 restrain block 61 against rotation and limit the blocks to relative rectilinear movement. Thus, the line of contact cannot move away from the valve ports and there is no leakage of the valved fluid. Not only is the convexity so small as to inhibit significant rotation, but the action of springs 64, which are symmetrically connected to opposite sides of the blocks, balances the blocks in their proper relative positions and causes a small flat to be developed which opposes rotation. Therefore the result is to create cooperating sealing surfaces which are essentially flat because of an increasing surface pressure which changes from a small pressure at the outer edges of the zone of contact to a large pressure at the center line of original contact.

In building a valve according to the present invention, it is desirable to make the valve faces as smooth as possible, and to assemble the parts in a dust-proof environment to avoid the electrostatic attraction of dust particles which would scratch the smooth surfaces, causing leakage and increased frictional resistance forces. For example, the parts may be assembled while immersed in clear water.

While specific embodiments of an improved slide valve have been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

What is claimed is:

1. A slide valve assembly comprising a support, a stationary valving member on said support provided with a first valve face having a first port, first fluid conduit means communicatively connected to said first port, a movable valving member having a second valve face slidably engaged with said first valve face and having a second port registrable with said first port, second fluid conduit means communicatively connected to said second port, guide means constraining sliding movement of said movable valving member relative to said stationary valving member to a linear path toward and away from a position of registration of said ports, and yieldable means urging said valving members together so that said valve face sealingly engages the first valve face, at least one of said valve faces having a convex contacting surface containing its port and extending along said linear path.

2. The slide valve assembly of claim 1, and wherein said first valve face is substantially flat and said second valve face is arcuately convexly curved relative to said first valve face.

3. The slide valve assembly of claim 1, and fluid pressure actuating means operatively connected to said movable valving member.

4. The slide valve assembly of claim 3, and wherein said fluid pressure actuating means comprises a diaphragm chamber provided with a flexible diaphragm, means coupling said diaphragm to said movable valving member, and control fluid conduit means communicatively connected to said chamber.

5. The slide valve assembly of claim 1, and wherein said movable valving member comprises a pair of cooperating platelike elements, and means connecting the platelike elements and holding one of said platelike elements in a curved configuration defining said convex contacting surface.

6. The slide valve assembly of claim 1, and wherein said movable valving member comprises a pair of cooperating platelike elements, said second fluid conduit means extending through one of said platelike elements and abutting the other platelike element, and means connecting said platelike elements on opposite sides of said second fluid conduit means and holding said other platelike element in a curved configuration defining said convex contacting surface.

7. The slide valve assembly of claim 6, and wherein said one of the platelike elements is normally curved and said other platelike element is normally substantially flat.

8. The slide valve assembly of claim 6, and wherein said other platelike element is formed with a countersunk recess coaxial with said second port and said second fluid conduit means is seated in said countersunk recess to act as an abutment support for holding said other platelike element in said curved configuration.

9. The slide valve assembly of claim 6, and wherein said one platelike element is provided with means to exert gripping force on said second fluid conduit means responsive to the connection together of said platelike elements.

10. The slide valve assembly of claim 9, and wherein said one platelike element comprises a spring plate normally convexly curved toward the other platelike element, said spring plate having an aperture through which said second fluid conduit means passes, said gripping means comprising serrations in said aperture normally allowing passage therethrough of said second fluid conduit means but clampingly engageable with said second fluid conduit means responsive to the connection together of said platelike elements.

11. The slide valve assembly of claim 1, and wherein said convex contacting surface is substantially cylindrical in contour, with its axis of curvature extending substantially parallel to said linear path.

12. The slide valve assembly of claim 1, and wherein said first valve face is substantially flat and said second valve face is substantially convexly cylindrical in contour relative to said first valve face, with its axis of curvature extending substantially parallel to said linear path.

13. The slide valve assembly of claim 1, and wherein both of said valve faces are convexly cylindrically curved with respect to each other, with axes of curvature extending substantially parallel to said linear path.

14. The slide valve assembly of claim 1, wherein said yieldable means comprises respective springs substantially symmetrically connecting opposite sides of said valving members together.

15. The valve assembly of claim 14, and wherein said convex contacting surface is substantially cylindrical in contour, with its axis of curvature extending substantially parallel to said linear path.

* * * * *